United States Patent [19]
Webster et al.

[11] 3,947,063
[45] Mar. 30, 1976

[54] HANDLING OF PHONOGRAPH RECORDS

[76] Inventors: Robert Roland Webster, 10 Broomfield Court, Common Road, Hatfield, Hertfordshire; David William Webster, 22 Wood Close, Hatfield, Hertfordshire, both of England

[22] Filed: Jan. 18, 1974

[21] Appl. No.: 434,518

[52] U.S. Cl. .................................................. 294/16
[51] Int. Cl.² .......................................... B65G 7/12
[58] Field of Search........ 294/1 R, 16, 25, 33, 99 R, 294/106; 2/20, 21, 163; 24/255 R, 255 BS, 255 FC, 255 P, 255 TZ; 224/45 K; 274/1 R, 1 J

[56] References Cited
UNITED STATES PATENTS 3,410,592  11/1968  Schweizer............................ 294/16
3,558,169  1/1971  Onanian................................ 294/16

*Primary Examiner*—Evon C. Blunk
*Assistant Examiner*—Johnny D. Cherry
*Attorney, Agent, or Firm*—Larson, Taylor & Hinds

[57] ABSTRACT

There is described an article, suitable for handling phonograph records, which is in the form of a supple, laminated pad comprising (*i*) a supporting layer, (*ii*) a cushioning layer and (*iii*) a contact layer there being formed in said pad an elongate aperture which is from about 1 to about 3 inches in length and of a width such that part of the rim of a phonograph record can pass through said elongate aperture.

3 Claims, 2 Drawing Figures

HANDLING OF PHONOGRAPH RECORDS

BACKGROUND OF THE INVENTION

This invention relates to an article suitable for handling phonograph records, e.g. Gramophone records.

It is well known that it is difficult to handle phonographic records, for example Gramophone records, in a manner such as to keep them clean or without finger marks or smears. It is an object of the present invention to provide an article which facilitates the handling of phonographic records.

SUMMARY OF THE INVENTION

According to the present invention there is provided an article, suitable for handling phonograph records, which is in the form of a supple, laminated pad comprising (i) a supporting layer formed of paperboard, cardboard or the like, (ii) a cushioning layer formed of a foam material, one face of the cushioning layer being secured to one face of said supporting layer, and (iii) a contact layer which is secured to the other face of said cushioning layer and which has a surface in the form of a soft short pile fabric, there being formed in said pad an elongate aperture which is from about 1 to about 3 inches in length and of a width such that part of the rim of a phonograph record can pass through said elongate aperture.

The supporting layer can be formed, for example, from a flexible paperboard, cardboard or similar material.

The cushioning layer can be formed, for example, from a conventional poly (vinyl chloride) foam.

The contact layer can be formed, for example, from velvet or from a material of similar appearance and properties produced from cotton and rayon; the contact layer is advantageously but not necessarily impregnated with an antistatic material.

The supporting layer can itself be covered, on the face thereof remote from the cushioning layer, with a decorative layer in order to improve the general appearance of the article; the decorative layer can be formed, for example, from a synthetic leather cloth.

DESCRIPTION OF THE PREFERRED EMBODIMENTS

In order that the pad may act as a holder for a phonograph record it is folded about a line colinear with the longitudinal axis of the elongate aperture. To facilitate this folding process the pad is advantageously provided with a crease at the point where it is desired to fold the pad, the crease acting as a hinge.

The pad can be any convenient shape, for example, square, round or oblong but it has been found that the most convenient size and shape is one corresponding broadly to the size and shape of the human hand. In general, the area covered by one side of the pad should not be larger than about 36 square inches or smaller than about 12 square inches. If the pad is longer in one direction than in any other direction it is preferable for the elongate slot to be disposed transversely of, and most preferably at right-angles to, said one direction and so that the elongate slot is not equi-distant from each end of the pad.

By folding the article of the present invention about a line colinear with the axis of the elongate aperture it is possible to hold a phonograph record without the fingers of the hand contacting the record and spoiling the surface thereof, the elongate aperture in the article helping to prevent the record slipping from the hand. With the article it is possible to remove a phonograph record from its sleeve and to place it on a turntable or remove it from a turntable and put it back into the sleeve without touching the record with one's hands. Also, when the article is unfolded it can be used as cleaning pad for phonograph records.

Figure 1:
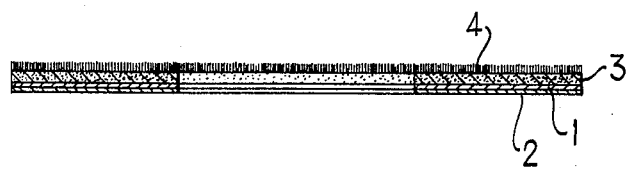
Figure 2:
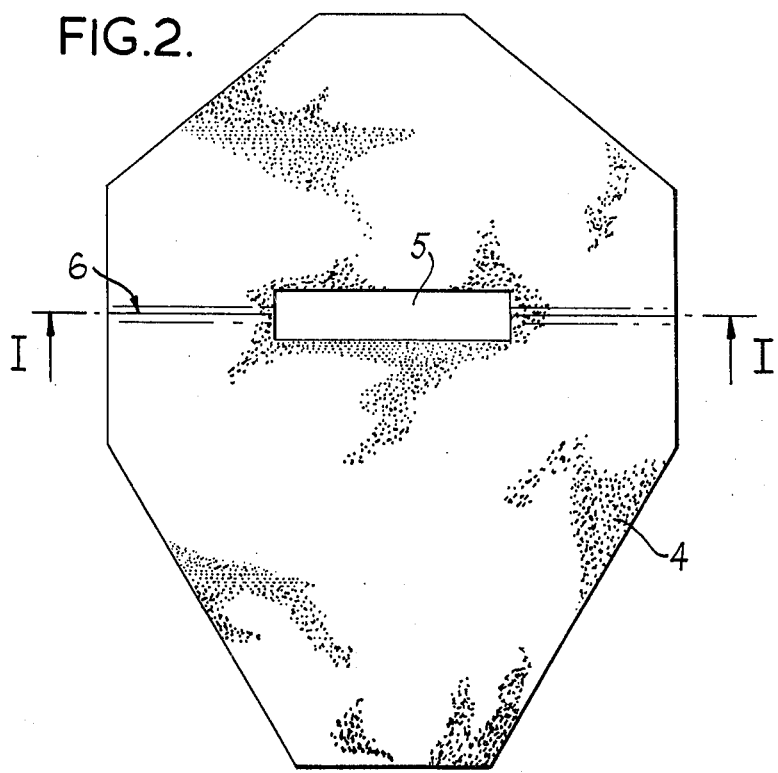

For a better understanding of the invention and to show how the same may be carried into effect reference will now be made, by way of example, to the accompanying drawing which shows one embodiment of an article according to the invention and in which FIG. 1 is a sectional view of the pad taken along the line I—I of FIG. 2; and FIG. 2 is a plan view of the pad.

A supporting layer 1 is formed from a sheet of cardboard and there is secured thereto, on one face thereof, a decorative layer 2 made from a poly (vinly chloride) leather cloth. On the other face of the supporting layer there is secured a poly (vinyl chloride) foam layer 3. The foam layer is covered with a contact layer 4 made from a synthetic velvet formed from cotton and rayon. An aperture 5 extends transversely of the sole axis of symmetry of the pad, the aperture being 1½ inches long and of a width such that the rim of a phonograph record can be passed therethrough. The article has a maximum length of 5 inches and a maximum width of 4 inches, the elongate aperture being disposed about 1¾ inches from the top of the article. A crease 6 is provided to facilitate folding of the pad.

We claim:

1. An article for handling and cleaning phonograph records, which article is in the form of a supple, laminated, foldable, normally flat pad of generally uniform thickness comprising (i) a supporting layer formed of paper board, cardboard or the like, (ii) a cushioning layer being secured to one face of said supporting layer, and (iii) a contact layer which is secured to the other face of said cushioning layer and which has a surface in the form of a soft short pile fabric, there being formed in said pad an elongate aperture which is from about 1 to about 3 inches in length and of a relatively narrow width such that part of the rim of a phonograph record can pass through said elongate aperture, said pad being readily foldable and unfoldable about a straight fold line along the longitudinal axis of said elongate aperture from a substantially planar unfolded configuration to a folded configuration in which the contact layers of adjacent areas face each other.

2. An article as claimed in claim 1, wherein the supporting layer is covered, on the face thereof remote from the cushioning layer, with a decorative layer.

3. An article as claimed in claim 1 wherein the pad is provided with a permanent crease along a line colinear with the longitudinal axis of the elongate aperture, the pad being relatively longer in a direction normal to the longitudinal axis of said aperture than in a direction along said axis, and said aperture being closer to one end than the other along said normal direction.

* * * * *